United States Patent [19]
Hadley et al.

[11] Patent Number: 5,249,470
[45] Date of Patent: Oct. 5, 1993

[54] ROTOR BLADE TRACKING DEVICES

[75] Inventors: Maxwell R. Hadley, Lyndhurst; Ian C. Cheeseman, Tarant Keynstone, both of England

[73] Assignee: Stewart Hughes Limited, Hamshire, England

[21] Appl. No.: 543,758

[22] PCT Filed: Jan. 13, 1989

[86] PCT No.: PCT/GB89/00035
§ 371 Date: Sep. 13, 1990
§ 102(e) Date: Sep. 13, 1990

[87] PCT Pub. No.: WO89/06623
PCT Pub. Date: Jul. 27, 1989

[30] Foreign Application Priority Data

Jan. 13, 1988 [GB] United Kingdom ............... 8800688
Aug. 9, 1988 [GB] United Kingdom ............... 8818830
Aug. 15, 1988 [GB] United Kingdom ............... 8819368

[51] Int. Cl.⁵ .............................................. G01D 7/00
[52] U.S. Cl. .................................................... 73/655
[58] Field of Search ................... 73/583, 655, 660; 356/28, 4, 27; 416/61; 250/206.1, 206.2, 236

[56] References Cited
U.S. PATENT DOCUMENTS 3,316,759  5/1967  Rehder ................................ 73/655
4,812,643  3/1989  Talbot .............................. 250/222.1

FOREIGN PATENT DOCUMENTS 0089228  9/1983  European Pat. Off. .

Primary Examiner—Robert Raevis
Attorney, Agent, or Firm—Pollock, Vande Sande & Priddy

[57] ABSTRACT

An apparatus for tracking a rotating blade to determine parameters associated with the rotation of that blade. In one embodiment, the apparatus includes a detector in which at least two sensing photodiodes define substantially fan shaped detector planes and are arranged to sense an illuminated point at a known location on the blade passing through these planes. The time taken for the point on the blade to pass between the planes is measured and parameters associated with the rotation of the blade are calculated therefrom. In another embodiment, the detector defines at least two divergent detector fields, and a reactive radiation source responsive to the passage of the blade through the detector fields is provided on the blade. The reactive radiation source is arranged to radiate a signal such as a light signal which is detected by the detector.

21 Claims, 6 Drawing Sheets

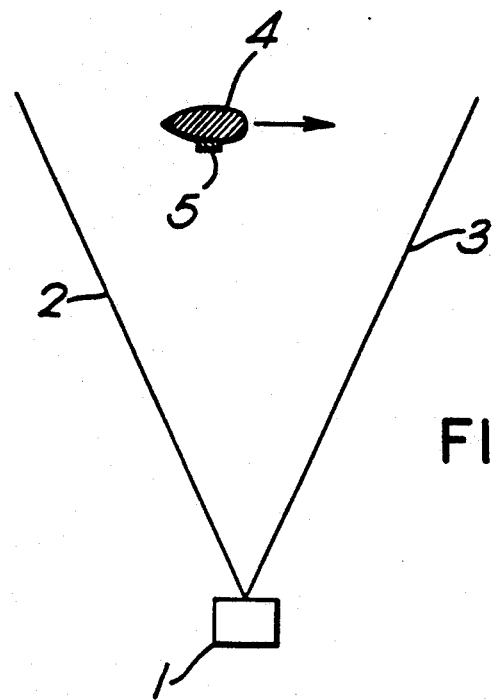
FIG. IA
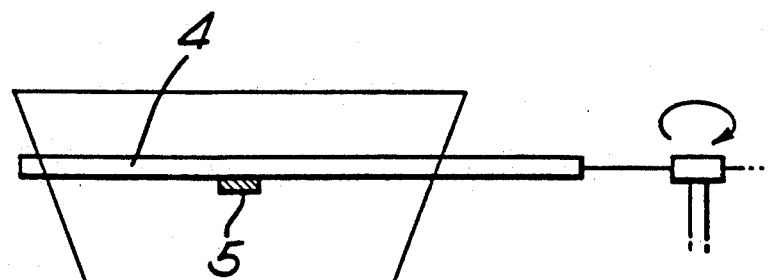
FIG. IB
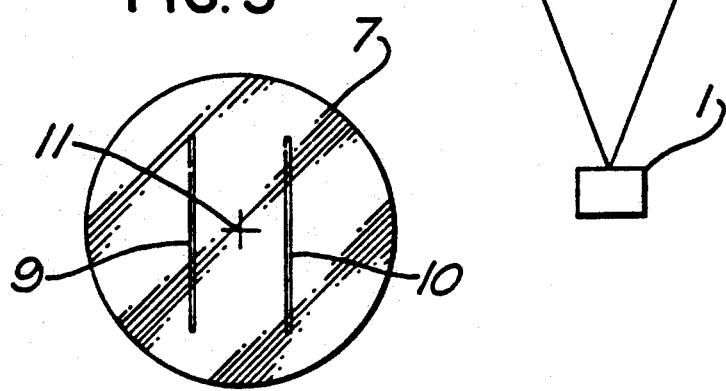
FIG. 3

Direction of blade motion ←
Direction of image motion →

ROTOR BLADE TRACKING DEVICES

FIELD OF THE INVENTION

This invention relates to methods and apparatus for measuring the deflections of a rotating body, and in particular to methods and apparatus for measuring deflections from the expected or desired path of a fan, windmill, propeller or helicopter rotor blade, and the like.

BACKGROUND OF THE INVENTION

In order to minimize the vibration levels of, and assist in the diagnosis of faults in, the operation of, for example, helicopter rotors, it is desirable to be able to measure under various operating conditions the deflections of the rotor blades of the helicopter in directions which may be axial or tangential to the direction of rotation of the blade. In the case of helicopter rotor blades, the axial and tangential deflections are referred to as track and lag variations, respectively, and by measuring their values under various flight conditions it is possible to calculate and subsequently effect various adjustments to the rotor head in order to minimize overall vibration in the helicopter over a wide range of flight conditions. It is also desirable that such measurements should be made automatically, i.e., without operator involvement, and it should be possible to make these measurements both at night when the level of background light is very low and during the day when the background light levels can vary significantly depending on weather conditions, for example.

Systems employing parallax methods to measure blade track and lag variations and either using stroboscopic lights to illuminate the blade as it passes over a sensor or relying on the occlusion of ambient light by the rotating blade as it passes over the field of view of the sensor have been proposed in, for example, U.S. Pat. No. 2,960,908. This patent discloses a parallax interval sensing device which, as applied to the helicopter field, enables the distances of the individual blades from a sensor to be determined automatically. A tracker device is disclosed which utilizes an optical sensing device to determine the transit time of a helicopter blade between two fields of view with a fixed parallax angle therebetween. Given that the blade velocity is known, its distance from the sensing device is readily determinable. The sensing device has optics designed to define two fields of view inclined at a defined angle and a photoelectric cell responsive to interruption by a blade of the light paths in the fields of view to produce a pulsatory signal containing information as to the time taken for the leading (or trailing) edge of the blade to transit between the fields of view. The further the distance of the blade from the sensor, the longer will be this transit time, so the measure of transit time provides a measure of blade distance from the sensor.

The arrangement described in this document requires a high contrast between the blade and the background light in order to provide a clear and discernable signal which changes with time. Where the intensity of the light to be obscured by the blade decreases, then the change of signal is smaller and the accuracy of the measurement and the resolution of the measurement decreases as a result.

It is also possible to operate the system of U.S. Pat. No. 2,960,908, during the hours of darkness by illuminating the side of the rotor adjacent to and facing the device by artificial means. For example, the patentees suggest in the operators' manual of their device the use of a 600W landing light GE4559 or equivalent. To make use of such a light, the system is capable of operating with light (illuminated) blades on a dark background, as well as with dark blades against a light background during normal daytime use.

In general switching over between the two modes of operation, i.e., during the day relying on background light or at night relying on artificial illumination, may be either manual, or preferably, automatic. Despite the inherent difference between optical signal employed, i.e., dark against light or light against dark, the calculation of blade height is not altered.

The proposed method of operating the apparatus of U.S. Pat. No. 2,960,908 at night has a number of disadvantages, which stem from the low level of illumination of the blade which is achievable in practice. Firstly, an intense light source consuming considerable electrical power must be used. The intensity of the light must not fluctuate significantly during the course of measurement, and it is generally convenient to operate the light from a DC supply, for example the 28V DC supply provided on board the aircraft. However, the power which may be drawn from this supply is in general quite limited, and this sets a limit on the maximum achievable light intensity incident upon the rotor blade when the system is used at night.

Another disadvantage is that rotor blades, particularly those fitted to military helicopters, are frequently painted in a dark or black anti-reflection finish in order to reduce the possibility of detecting the aircraft under combat conditions, and this further reduces the level of light which the detector must be capable of detecting.

OBJECTS AND SUMMARY OF THE INVENTION

It follows that there would be a considerable advantage in providing a sensor which will operate using a significantly lower light level incident on the blade than has previously been possible, and this constitutes a principal object of the present invention.

In one aspect, the present invention resides in the realization that, by providing an illuminated point on the blade and arranging for the passage of that point to be detectable, the need to provide a high powered illuminating source to enable movement of the blade to be detected at night has been abviated. Furthermore, by arranging the detector so that it defines substantially planar detection regions, it is possible to measure accurately the position of the blades over a wide range of normal blade operating positions by simply detecting movement of the illuminated point. In other words, this aspect of the invention provides apparatus for illuminating only a point at a known location on the blade, as opposed to the prior art approach of illuminating a major portion of the blade, and detecting movement of that point between at least two substantially planar detecting regions.

According to this one aspect of the invention, therefore, there is provided an apparatus for tracking a rotating blade to determine parameters associated with the rotation of that blade, the apparatus comprising a detector in which at least two sensing means defining substantially fan shaped detector planes are arranged to sense an illuminated point at a known location on the blade passing through said planes. The said apparatus may either incorporate or be adapted for operation with timing means responsive to said sensing means for measuring the time taken for the point on the blade to pass between said planes, and calculating means for calculating parameters associated with the blade's rotation from the measured time.

In the practice of this aspect of the invention, the fan shaped detector planes may be realized either by the use of elongate photodiodes, for example, or by the use of a plurality of discrete point photodiodes linearly juxtaposed to define an elongate sensing element. Advantageously, the definition of the detector planes may be enhanced by the use of optical devices such as lenses associated with the sensors. Alternatively, it is conceivable that an equivalent situation might be achievable by use of a pair of point photodiodes in combination with optical systems configured to provide each photodiode with a fan-shaped planar field of view.

The illuminated point on the blade might, in one exemplary embodiment of the invention, comprise a small area of retro-reflective material, for example, with illumination means being provided on or associated with the detector to provide light for illuminating said retro-reflective material. In such an arrangement, the illumination means, might for example, comprise a plurality of light emitting diodes provided on the apparatus and spaced about the said at least two sensing means, with the light from the diodes directed generally towards said illuminated point on the blade. Alternatively, the illumination means can comprise at least one laser directed towards said illuminated point on the blade.

In another embodiment of the invention, the illuminated point on the blade is realized by way of a reactive light source which is advantageously arranged to emit light when the blade is in the vicinity of the detector planes. By using a reactive light source, it is possible to reduce further the several amount of radiation required to detect passage of the blade between the two detector planes, and the overall power consumption of the apparatus 11 be reduced accordingly. Such a reactive light source may, for example, be provided at a predetermined location on each blade, or may alternatively be provided at the tracker apparatus for illuminating a reflector on each blade.

In order to ensure that the illuminated point on the blade is only active when the blade lies in the vicinity of the detector planes, the apparatus may further comprise a trigger radiation source associated with at least one of said detector planes, and the illuminated point on the blade may comprise trigger sensing means responsive to the radiation from said trigger source for activating a light source mounted in or on the blade. The trigger radiation source may, for example, comprise an infrared diode, and the trigger sensing means may comprise an infrared sensing photodiode.

In order to increase the accuracy to which the height of the blade may be calculated, the illuminated point may advantageously be located at or near the end of the blade.

It may sometimes prove necessary to perform tests on a helicopter rotor in the field under combat conditions. Performing such tests using, for example, the above-mentioned prior art arrangements would be highly undesirable at night because the amount of light radiation used to illuminate the blade for the purpose of blade detection would quickly draw attention to the aircraft. While it could not be said that the present invention obviates the problem of detection under combat conditions, it is suggested that by arranging for only a point on the blade to be illuminated and the radiation from that illuminated point to be detectable in only narrow detection planes, it is possible to reduce the likelihood of detection of the aircraft under test in combat conditions.

In accordance with another of its aspects the present invention thus resides in the realization that, by providing a reactive source on the blade, which source is responsive to the passage of the blade through divergent detector fields to emit a signal to the detector, it is possible to calculate accurately the track of the blade during the day or at night without the need for large and/or powerful blade illumination sources.

Accordingly, the invention also provides the combination of an apparatus for tracking a rotating blade to determine parameters associated with the rotation of that blade, the apparatus comprising a detector defining at least two divergent detector fields, and a reactive radiation source responsive to the passage of the blade through the detector fields for radiating a signal for detection by the detector. Such a combination might include or be adapted for use with calculating means for calculating one or more parameters associated with the rotation of the blade from the detected signal.

In the practice of this aspect of the invention, a reactive radiation source may be provided on each blade, and a trigger radiation source associated with at least one of said detector fields ma be arranged to emit a triggering radiation, and a trigger sensing means responsive to the triggering radiation may be provided in each reactive radiation source in order to limit activation of the reactive radiation source to when the blade is passing between the detector fields. In this way, the power consumed by the reactive radiation source is limited to that consumed during a relatively small time period, namely, the time for the blade to pass between the detector fields.

By synchronizing the triggering radiation to the rotation of the blade——an easy task since normally a tachometer will be provided to generate event markers associated with rotation of the blade——it is possible to limit the trigger radiation to a relatively small time period, namely, the time for which the blade is known to be in the vicinity of at least one of the sensor fields. This offers the advantages of reduced power consumption and reduced spurious radiation when the apparatus is in use.

Advantageously, the trigger radiation source emits a trigger signal modulated at a first modulation frequency and in response thereto the reactive radiation source emits a reactive signal modulated at a second modulation frequency. To reduce the possibility of stray signals being detected, the first modulation frequency may in practice be set at a frequency different from the second modulation frequency. Alternatively, the first modulation frequency may be set equal to the second modulation frequency. The modulation could further include coding, as by pulse code modulation, so that each of the blades of a helicopter rotor, for example, might be positively identifiable.

The reactive radiation source can be adapted to react to one kind of radiation, for example, infrared light from an infrared emitting diode or collimated light from a laser, while radiating another kind of radiant energy, for example, visible light or radiowaves. Where the reactive radiation source is made responsive to visible light, the source can advantageously comprise ambient light rejection means for rejecting ambient light signals received thereby.

The invention also extends to a method of tracking a rotating blade to determine parameters associated with the rotation of that blade, in which method the passage of an illuminated point at a known location on the blade through two divergent and for for example substantially fan shaped detection planes is timed and the parameters are calculated therefrom.

BRIEF DESCRIPTION OF THE DRAWINGS

In order that the invention may be more clearly understood, several embodiments thereof will now be described, by way of example, with reference to the accompanying drawings, in which:

FIG. 1A is a schematic view of a detector in relation to a blade as seen radially to the blade;

FIG. 1B is a schematic view of a detector in relation to a blade as seen tangentially to the blade;

FIG. 3 is a schematic view of sensors in the detector;

DESCRIPTION OF PREFERRED EMBODIMENTS

Referring first to FIG. 1, a detector 1 is mounted at a convenient location on an aircraft (not shown) and, as will be described in greater detail hereinafter, is arranged to define two substantially planar fan shaped fields of view 2,3 through which a rotating blade 4 will pass. An illuminated point 5 is provided on the blade 4 at a predetermined location by way of, for example, a small area of retro-reflective material such as "Scotchlite 2870" Registered trademark secured to the blade. An illumination source, not shown in FIG. 1, is provided at or near to the detector 1 and is directed towards the blade 4 so that light therefrom falls onto the illuminated point 5 as the blade passes through the fields of view 2,3 of the detector and is directed back towards the detector along paths associated with the fields of view.

Figure 2A:
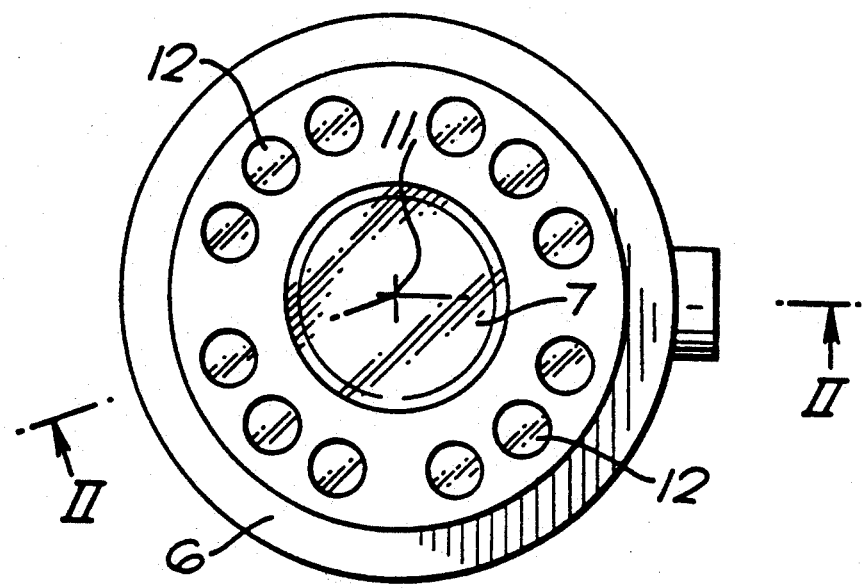
FIG. 2A shows a detector in plan view.
Figure 2B:
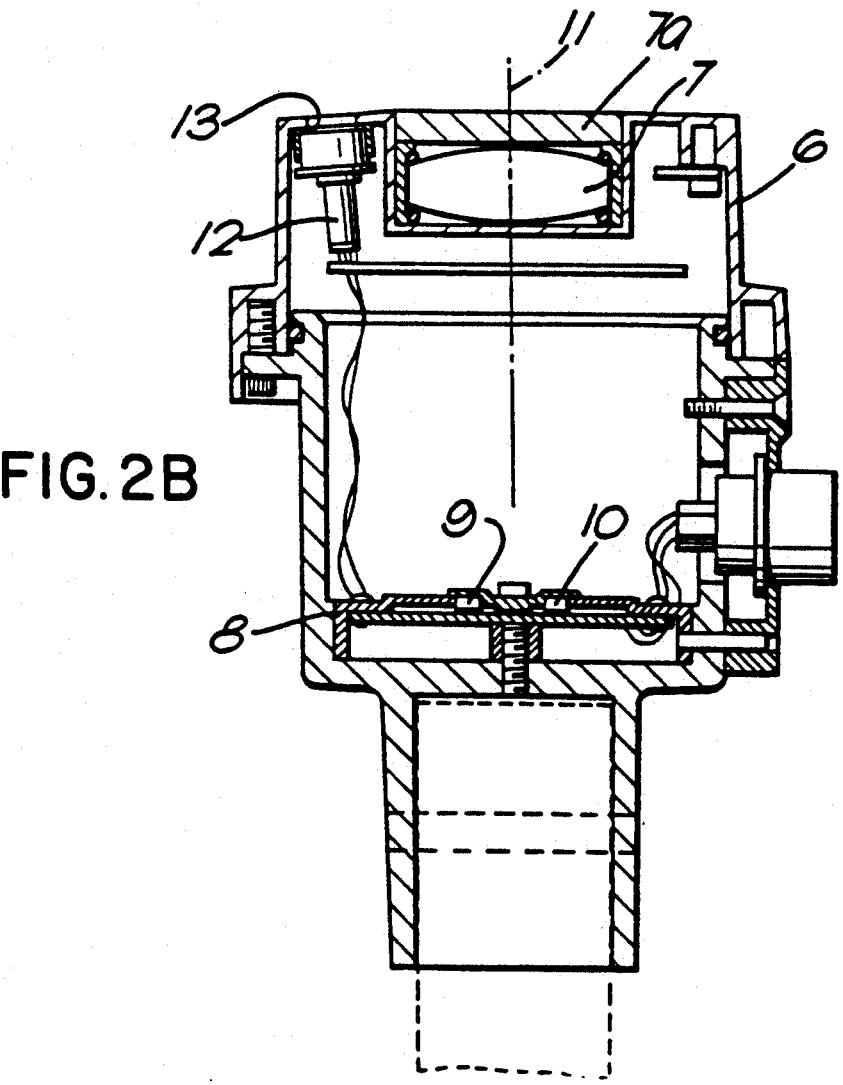
FIG. 2B shows a sectional view of the detector along line II—II.

The detector 1 is shown in greater detail in FIGS. 2 and 3.

As can be seen from FIGS. 2 and 3, the detector 1 comprises a body 6 containing a lens 7 which is so disposed as to focus an image of the retro-reflective material onto a plane 8 in which are situated two or more elongate linear photodiodes 9,10. The length of the photodiodes 9,10 and the focal length of the lens 7 are selected so as to ensure that the retro-reflector image crosses the photodiodes at some point along their length over the range of track displacements encountered in normal operation of the rotor. The linear photodiodes are of a width, typically 1 mm, which is small compared to their length, typically 20 mm, and are arranged with the long dimension lying substantially radial to and the short dimension substantially tangential to the rotation of the rotor. The diodes are symmetrically disposed about the optical axis 11 of the lens 7.

The detector 1 also comprises one or more light emitting diodes 12 of high efficiency which are arranged to lie as close as possible to the optical axis of the lens, without obscuring it, and are preferably disposed in the form of a ring of eight or more diodes equally spaced about the lens 7. Each diode 12 is fitted with a collimating arrangement 13 to concentrate its light radiation towards the illuminated point 5 on the blade 4 in the direction of the field of view of the lens and photodiodes. It is convenient if the LEDs used ar high efficiency GaAs type emitting infrared light of approximate wavelength 950 nm. Furthermore, an optical filter may be placed in front of or behind the lens to prevent light of substantially different wavelength from reaching the photodiodes and producing spurious signals. It is also desirable that the light from the LEDs be modulated with a frequency of between 10 kHz and 100 kHz, for example. Typically, the light radiated from the LEDs 12 is concentrated within a cone of about 6° half angle, the LEDs 12 being mounted to radiate in slightly different directions so as to illuminate evenly within the fields of view of the linear photodiodes 9,10. It has been found that a lens of 85 mm focal length and physical diameter of 42.5 mm minimize the effect of lens aberration and the like and optimizes the performance of the detector. An 85 mm f.2 Olympus camera lens is thus suitable.

The detector is arranged to be mounted on the aircraft body in such an orientation with respect to the rotor that, as the rotor turns, the reflector on the blade 4 passes sequentially through each of the planar fan shaped lines of sight 2,3 defined by the lens 7 and each of the elongate linear photodiodes 9,10. Light emitted from the light emitting diodes 12 is reflected by the retro-reflective material defining the illuminated point 5 on the blade back toward the lens 7 and is focussed by the lens 7 to produce a image of the illuminated point 5 substantially in the plane of each of the elongate photodiodes 9,10. As the rotor turns, the image moves along a line in this plane substantially at right angles to the long dimension of the elongate photodiodes 9,10 and is sensed by the elongate photodiodes which output a signal in response thereto. The signal output from each elongate photodiode 9,10 comprises a short pulse which is generated as the image of the reflector passes across the photodiode. Because of the nature of this type of photodiode, the signal output therefrom is substantially independent of the point along the length of the photodiode at which the image of the reflector passes across its short dimension The precise point at which the image crosses will depend on the arrangement of the blade tracking device with respect to the rotational axis and the instantaneous plane of the blade, and on the distance from the rotation axis to the retro-reflector on each blade and the axial (track) displacement of each blade.

Figure 4:
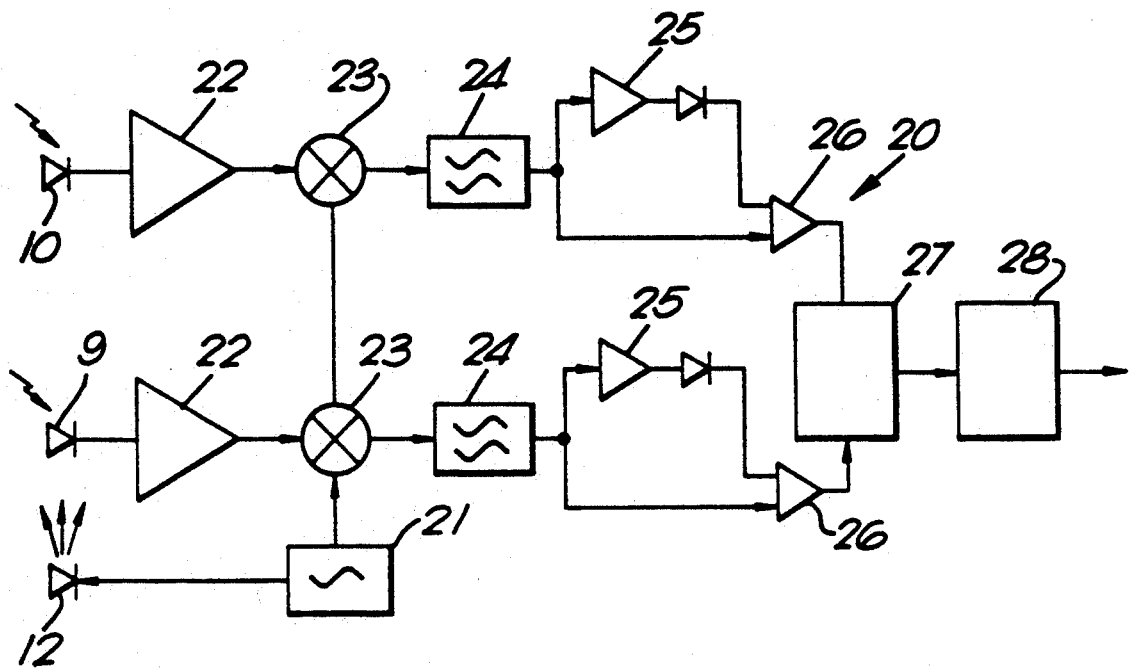
FIG. 4 is a schematic detector circuit diagram.
Figure 5:
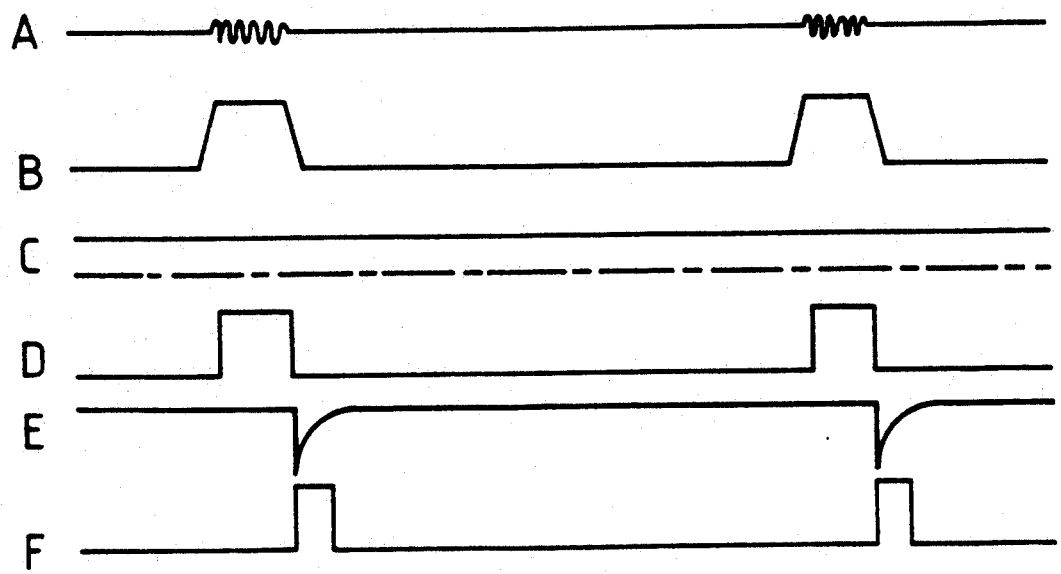
FIG. 5 shows waveforms associated with various portions of the FIG. 4 circuit.

Referring now to FIG. 4, an exemplary circuit 20 associated with the detector 1 is shown as comprising an oscillator 21 which generates a square wave of 33 kHz frequency used to modulate the LEDs 12. Light emitted from the LEDs 12 as described above is reflected from the retro-reflective point on the blade 4 within the fields of view 2,3 of the detector 1. The light detected by the photodiodes 9,10 causes each of the photodiodes to generate an electrical signal (as shown in FIG. 5A) which is amplified by respective band-pass amplifiers 22 and then applied to respective synchronous demodulators 23. The oscillator 21 also supplies a reference waveform to each of these demodulators 23 and thus the signals from the photodiodes pass through synchronous demodulators 23 fed with a reference signal derived from the same oscillator 21 as the modulation. This serves to prevent spurious light which may pass through the filter and be received by the photodiodes, but which is not modulated, from affecting the measurement of the time period for the blade to pass between the two sensor fields 2,3 as shown in FIG. 1. The output from the demodulators is low pass filtered by filters 24, resulting in the waveform shown in FIG. 5B. which waveform comprises a single pulse representing the image of the reflector passing across the respective photodiode 9,10.

As the size of the reflector and its distance from the blade tracking device will vary depending on the type of helicopter or other rotor to be measured, the amplitude of waveform 5B will vary over a considerable range. In order to measure accurately the time taken for the reflector to pass between the two fan shaped planar fields of view 2,3, each signal 5B is applied to a respective peak detector 25 which, as shown in FIG. 5C, generates a voltage equal to half the peak level of the waveform 5B. A pair of comparators 26 compares the waveform of 5B with this voltage level, and generates a pulse waveform (FIG. 5D) when the signal 5B is greater than 5C. Waveform 5D has more rapid rise and fall times than waveform 5B, and its falling edge is coupled via network 27 to monostable 28 which generates a pulse signal having a pulse width of approximately 100 microseconds (FIG. 5F).

Network 27 is used to combine the signals from the two photodiode signal processing channels to generate a single pulse train. The time between successive pairs of pulses of this signal is used to calculate the blade height, as will be explained hereinbelow.

Figure 6A:
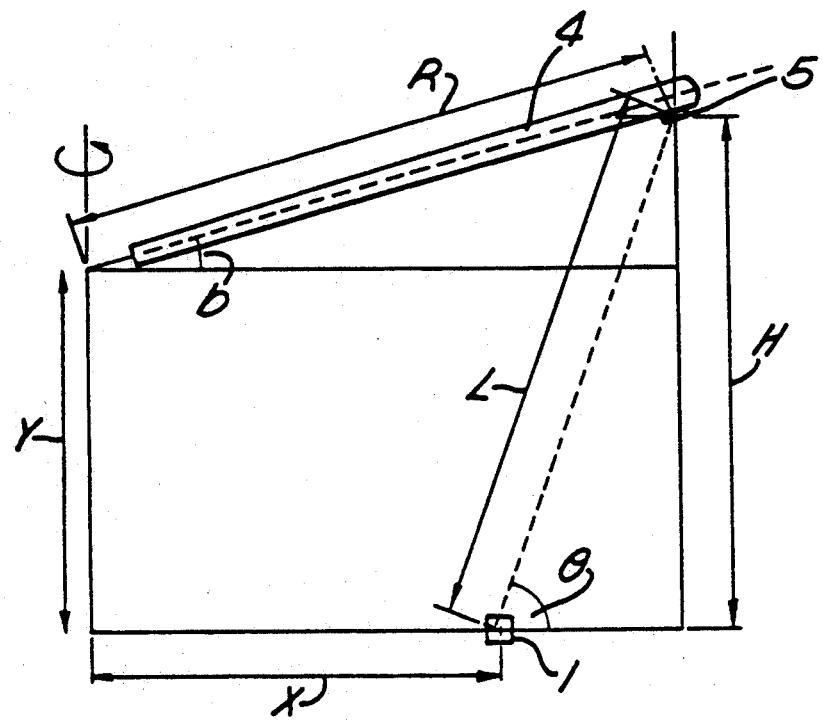
FIGS. 6A and 6B show the relationship between various parameters used in calculating the blade height.

Referring now to FIG. 6(a), the following trigonometric relationships can be derived:

$$RSinb + y = LSin\theta$$

$$RCosb = LCos\theta + x$$

Figure 6B:
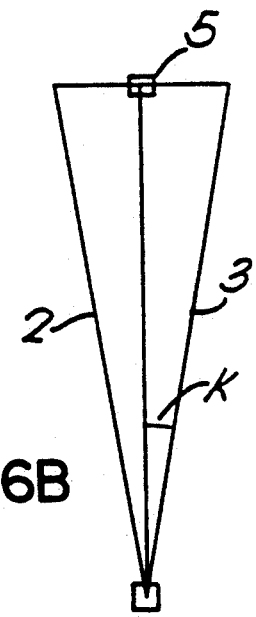

Similarly from FIG. 6(b), assuming
 w = angular velocity of the blade and
 T = time interval for blade to pass between the two fields of view
the following relationship can be shown to be true:

$$wTRCosb = 2RTank$$

In practice the flap angle is small, typically less than ±12°, and accordingly $Sinb \Omega b$ and $Cosb \Omega 1$.

The purpose of the algorithm is to calculate H, where H is the height of the illuminated point above a reference plane. In FIG. 6(a), $H = LSin\theta$ and by simple trig, since $$Sin\theta = \sqrt{1 - cos^2\theta}$$

it can be shown that $$H = \frac{RwT}{2tank} \sqrt{1 - \left[\frac{(R - X)2tank}{RWT}\right]^2}$$

which can be easily calculated by any standard computer since all variables other than T are known and T is determined by way of the detector.

The lag displacement in radians of the rotor blade can be determined by measuring the time from a pulse produced by a reference magnetic pickup on the rotor shaft to the mean of the times of occurrence of the two pulses corresponding to passage of each blade multiplied by the angular velocity of the rotor.

In another embodiment of the invention, the area of retro-reflective material which comprises the illuminated point on the blade is replaced by a reactive light source or transponder which is responsive to the passage of the blade through the detector fields to pulse a signal to the detector.

Figure 7:
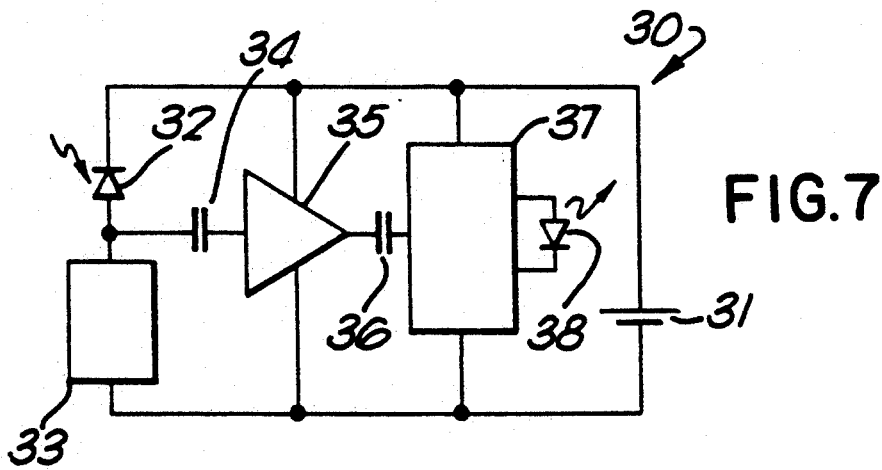
FIG. 7 is a first circuit diagram of a reactive light source mountable on the blade.

The reactive light source or transponder unit is adapted to be attached at or near the blade tip or at any other suitable location on the blade, and incorporates a circuit 30, shown in FIG. 7, comprising a battery 31, a light sensing trigger photodiode 32, an ambient light rejection circuit 33, a first capacitor 34, an amplifier 35, a second capacitor 36, a trigger circuit 37 and a transmitter light emitting diode 38.

Because of the very high g-forces (up to 1,000 g) at the blade tip, the mass of the transponder cannot be too great, as otherwise damage might result. Moreover, to avoid excessive drag, the transponder must be as small and as thin as possible. For example, a transponder suitable for a Lynx helicopter ideally weighs 7 g, and is approximately 30 mm×60 mm×1.3 mm. This puts severe limitations on the choice of power source.

A suitable power source has been found to be a Li/MnO2 button cell such as the CR2016 manufactured by Compton Vidor; it is 20 mm in diameter, 1.6 mm thick, has a nominal voltage of 3.0 V open circuit and a capacity of 60 mAh. It will operate satisfactorily over the temperature range −20 deg C. to +50 deg C., and for short periods at −30° C. to 30α° C.

With a power source such as this, it is not feasible to run the LED 38 continuously, as this would drain the battery 31 in about 24 hours. To increase the battery life, it is necessary to switch on the LED only while it is in use, and preferably only while it is in the field of view of the tracker. The span of the fields of view of the detector 1 is about 10% of a complete rotation of the blade, and this means that a continuous operating life of 240 hours (10 days) can be achieved in this way.

Since the transponder will normally be turned on only while a measurement is in progress, and as a typical measurement takes about 20 s, and is repeated 10 times per flight, the potential battery life increases to 1,000 flights—about a year of normal operation.

The detector 1 is adapted to include a triggering light source which emits a beam of light which is detected by the light sensing trigger photodiode 32. The beam from the trigger source is arranged to be coincident with the detector planes 2,3 of the detector 1, as shown in FIG. 1, and conveniently, the trigger source may, for example, comprise the, or some of the, LEDs 12 as shown in FIG. 2. Alternatively, the LED's may be replaced by, for example, Laser LEDs or the like arranged to produce a beam or beams of light which will be detected by the trigger photodiode 32 of the transponder as the transponder enters at least the first of the detector planes 2,3.

The trigger photodiode 32 is arranged to switch on the circuit 30 in response to the trigger signal from the trigger source on the detector 1 by switching power from the battery 31 to the other components of the circuit 30. The ambient light rejection circuit 33 is sensitive to the level of ambient light and serves to adjust the sensitivity of the trigger photodiode 32 and the intensity of light emitted from the transmitter light emitting diode 38. The ambient light rejection circuit 33 helps to reduce the likelihood of the transponder circuit 30 responding incorrectly to spurious reflections from the aircraft, for example. In order to substantially obviate the problems caused by spurious reflections and the like, the triggering signal can be modulated and the transponder circuit 30 made sensitive only to such modulated signals. Typically, the trigger signal would be modulated at a frequency of, say 33 kHz.

The light emitting diode may be that one commercially available under the reference CQX48-B, manufactured by Telefunken, and the photodiode may be the one commercially available under Model No. PBW50, manufactured by Phillips Components Limited.

To this end, the signals received by the photodiode are amplified by means of amplifier 35 and passes to trigger circuit 37 which serves in combination with capacitor 36 to sense the AC component of the signal, which in the example is 33 kHz. Trigger circuit 37 couples battery 31 to transmitter light emitting diode 38 to provide a return signal or return flashes which are detected by the sensors in the detector 1. The light emitting diode 38 may transmit radiation of the same frequency and wavelength as that received by photodiode 32 or may be different.

Where different wavelength signals are used for the trigger and transponder radiation, the tracker receive lens is fitted with an optical filter which renders it insensitive to light emitted by the LEDs generating the trigger radiation. This has the advantage that GaAs LEDs which are less efficient but are available with higher power outputs can be used as the trigger radiation, and GaAlAs LEDs which have a higher efficiency can be used as the transponder source, thus further improving battery life. GaAs LED radiation has a typical wavelength of 950 nm, while the GaAlAs LED emits at about 880 nm. An optical filter transparent at 880 nm and opaque at 950 nm should therefore be fitted in front of the imaging lens of the detector.

In the transponder arrangement described with reference to FIG. 7, each time a triggering signal from the detector is received by the photodiode 32, that signal is amplified and used in the generation of a responding signal from the transponder. In this way, the transmitting LED will automatically transmit a signal at the correct frequency, which frequency may be exactly that of the received signal or a multiple thereof. However, because of the finite response time of the various components which make up the transponder, there will inevitably be a time delay between the transponder receiving a triggering signal transmitting a signal.

It will be appreciated that each blade that constitutes the rotor will be provided with a transponder to enable the track and lag of each blade to be measured. In order to facilitate identification of the blades as they rotate, each transponder can be arranged to transmit on unique frequency and/or modulation combination whereby radiation transmitted by one blade can be distinguished from that of other blades. This feature enables a particular blade on the rotor to be identified as a "datum" and does away with the need for a tacho device attached to the rotor to provide a datum point for the measurements.

However, if the above mentioned time delay in the transponder is ignored, problems of synchronization between the detector circuit and the transponder circuit can arise, negating any advantages gained by omitting the tacho device. To overcome the problem of synchronization, a predetermined and fixed delay may be incorporated in the transponder circuit, so that radiation from the transponder is 90° or more out of phase with the modulation of the trigger radiation. By providing a phase sensitive detector in the detector circuit, any spurious radiation ,reflected from the blade, which radiation will not have undergone the required phase shift, would be rejected by the phase sensitive detector in the detector circuit.

Moreover, a flip-flop divider may be inserted between the amplifier 65 and the trigger circuit 67 to effectively change the modulation frequency.

It is also possible to provide for an increase in the modulation frequency, whereby one pulse of light received by the photodiode 32 results in a "burst" of modulated frequency by light emitting diode 38. To this end, it is necessary to insert a phase locked loop circuit and frequency multiplier circuit between amplifier 35 and trigger 37. This will increase the pulses received by the photodiode to a multiple for transmission by the light emitting diode 38. The phase locked loop serves to adjust the response of the light emitting diode 38 to the signal received by the photodiode 32 to bring the output of the light emitting diode into phase with the detector receiver circuit (FIG. 4).

Figure 8:
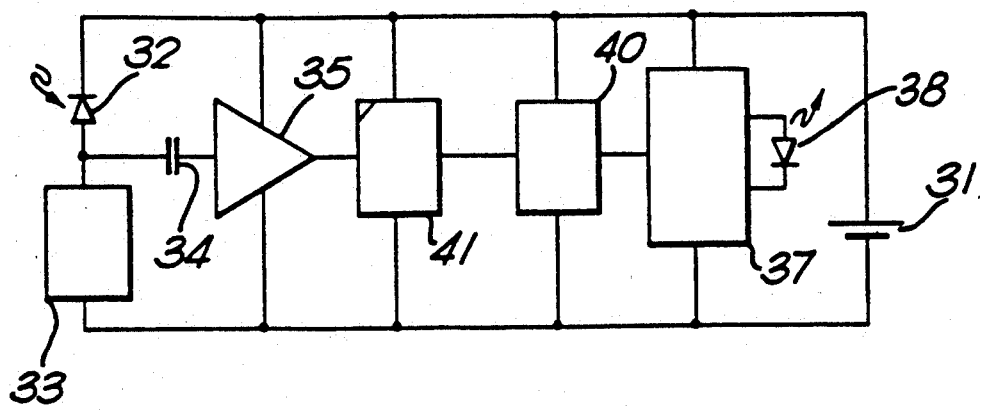
FIG. 8 is a second circuit diagram of a reactive light source.
Figure 9:
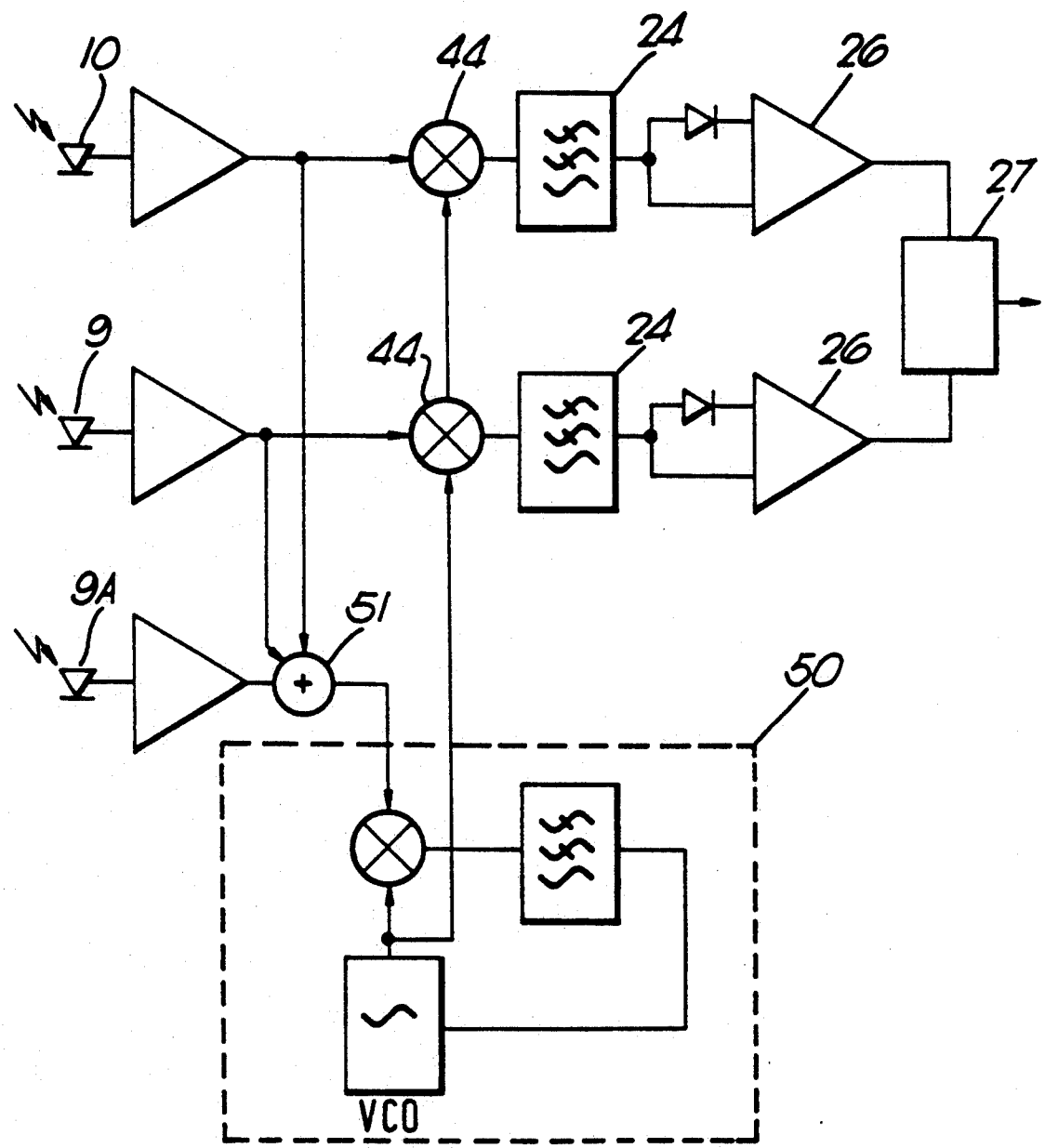
FIG. 9 shows a modification to the detector circuit for use with the second reactive light source.

An alternative arrangement for the detector circuit and transponder circuit is shown in FIGS. 8 and 9. In the transponder circuit shown in FIG. 8, a free running frequency oscillator 40 is controlled by a monostable 41 driven by amplifier 35. The monostable 41 is provided to ensure that the oscillator does not remain on longer than is necessary, typically 20 mS, thereby ensuring that an excessive drain is not placed on the battery. The oscillator 40 is used to drive the trigger circuit 37 which provides the same function as the trigger circuit 37 in FIG. 6, namely, to drive the LED 38 so that it transmits radiation at a given modulation frequency in response to one or more trigger flashes received by the photodiode 32.

In combination with this arrangement, a phase locked loop circuit is incorporated into the detector circuit, as shown in FIG. 9.

Figure 10:
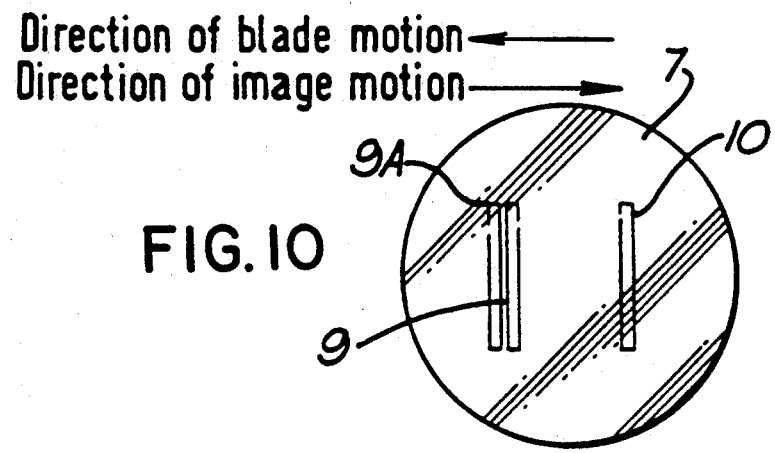
FIG. 10 shows a modification to the detector to accommodate the FIG. 9 circuit.

The phase locked loop circuit 50 in the detector circuit synchronizes the internal 33 kHz oscillator to the received signal from the transponder. Since PLLs take a finite time to achieve lock, a third photodiode 9A is required in the detector (see FIG. 10) to pick up the radiation from the transponder and enable the PLL circuit 50 to lock before the target is seen by the diodes 9,10. The PLL circuit 50 has a memory effect, and this means that lock is maintained to within the required accuracy before the radiation from the transponder is seen by either diode 9,10. Signals from diodes 9,10 may also be used to refresh the PLL's memory by summing their outputs at summer 51. This system has the considerable advantage that the power consumption can be kept very low.

By virtue of this arrangement, the trigger signal from the detector will commence transmission of radiation from the transponder, and radiation is sensed by the photodiodes 9,10 with the phase locked loop circuit 50 pulling the tracker circuit into phase with the transponder.

Figure 11:
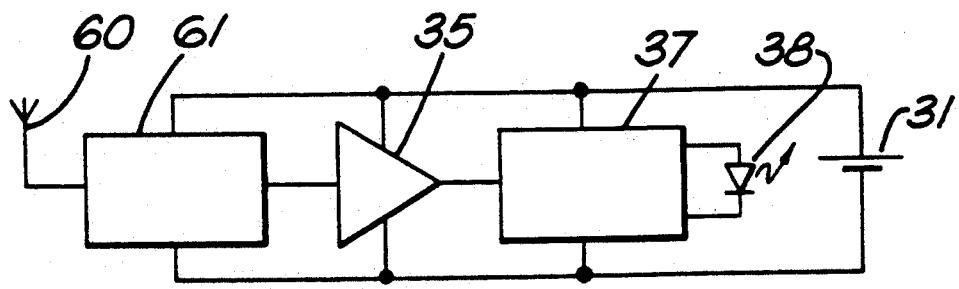
FIG. 11 shows a schematic circuit diagram of an RF controlled reactive light source.
Figure 12:
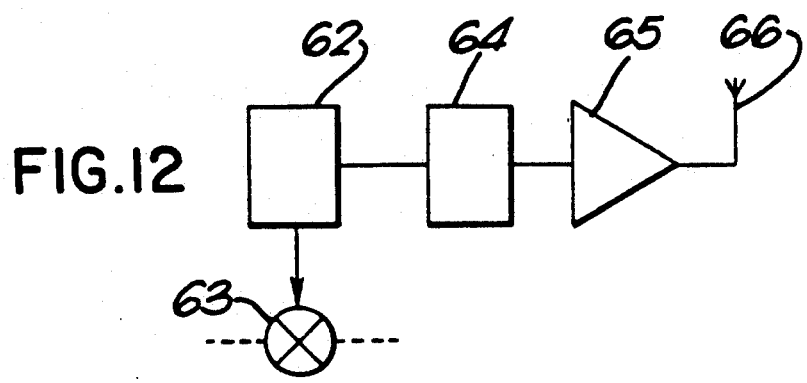
FIG. 12 is a schematic diagram of an RF trigger circuit.

The trigger sensing photodiode in the transponder circuit may be replaced by a small RF aerial 60 and receiver 61 as shown in FIG. 11. An RF transmitter circuit as shown in FIG. 12 is provided in the vicinity of the detector and includes an oscillator 62 coupled to the detector circuit via a phase sensitive detector 63 and activates RF modulator 64 and transmitter 85 to radiate via aerial 86 RF trigger radiation for reception by aerial 60 on the transponder. This particular arrangement which replaces the triggering LEDs on the detector requires only a few milliwatts of radio frequency power to act as a triggering signal for the transponder.

Embodiments of the invention have been described in which a plurality of LEDs are provided on or near to the detector, and these LEDs are used to illuminate a retro-reflective part on the blade or to provide a triggering signal to activate a reactive light source on the blade. By replacing these lEDs with accurately positioned and directioned laser sources it may be possible to provide for even greater accuracy of measurement of the position of the blade. Alternatively, by providing, say, a laser diode a the transmitting source in the transponder, it may be possible to eliminate the need to use elongate sensor arrangements which define a substantially planar fan shaped detecting region. Instead, sensors which define a broader or even a substantially conical detecting region may be used.

In summary, the present invention in one of its aspects provides for the detection of a bright spot on each blade of a helicopter rotor, for example, as it crosses two detector planes which diverge from one another, so that the time period between the crossing of the two planes by the bright spot provide, inter alia, a measure of the blade height. The two detector planes may conveniently be defined by use of two elongate detector elements and associated optics, though alternative arrangements are possible. The bright spot provided on each blade may be constituted simply by a reflector, preferably a retro-reflector, provided on the blade, in which case the apparatus may advantageously be provided with a light source for illuminating the reflections. The optical system is simplified and made more effective by provision of such illuminating source(s) on the tracking apparatus in close proximity to the detectors, but alternative arrangements could, at least in principle, be provided where the illuminating source(s) are mounted spaced apart from the tracker apparatus. The illuminating source(s) could be continuously illuminated, though possibly with their illumination modulated in some manner, or alternatively a reactive system could be provided where the illumination is provided at the appropriate times or on demand. Thus, for example, the bright spots on the blades could be constituted by light sources which could be on all the time, or could be on only when switched by a tachometer associated with the rotor shaft, or could be arranged to switch on only when a detection is made that the blade is in the detection beams. In the latter arrangement, each blade might carry a transponder responsive to illumination, for example from the tracker, to provide a return light pulse to the tracker. While optical means are specifically described for defining the two planar detector fields, it is at least conceivable that other means might be available to achieve a corresponding effect, and the invention is thus not to be regarded as limited to optical systems, albeit such systems are preferred.

We claim:

1. An apparatus for tracking a rotating blade to determine parameters associated with rotation of said blade, said apparatus comprising
   (a) a detector having at least two sensing means, each of said sensing means having a respective substantially planar fan-shaped field of view, said at least two sensing means being oriented such that the respective fields of view are divergent with respect to each other;
   (b) defining means mountable on said blade for defining a point at a known location on said blade; and
   (c) means for illuminating the point defined by the defining means;
   (d) timing means for timing the passage of said blade between said fields of view and providing data related thereto, and calculating means for calculating from said timing data parameters associated with rotation of said blade;
   (e) wherein said detector is adapted to sense the point defined by said defining means on said blade as said point passes through each of said fields of view.

2. An apparatus according to claim 1, wherein said sensing means each comprise elongate photodiodes.

3. An apparatus according to claim 1, wherein said illuminating means is adapted to direct light towards said detector and said detector further comprises focusing means between said defining means and said sensing means for focusing light towards said sensing means.

4. An apparatus according to claim 1, wherein said defining means comprises a small area of retro-reflective material, and said illuminating means is provided at said detector and is oriented to illuminate said retro-reflective material in use.

5. An apparatus according to claim 4, wherein said illuminating means comprises a plurality of infrared diodes spaced about said at least two sensing means, each infrared diode being directed towards said retro-reflective material in use.

6. An apparatus according to claim 4, wherein said illuminating means comprises at least one laser directed towards said retro-reflective material in use.

7. An apparatus according to claim 1, wherein said point defining means comprises a light source.

8. An apparatus according to claim 7, wherein said light source is adapted to emit light when said blade is in the vicinity of said detector planes.

9. An apparatus according to claim 8, wherein said detector further comprises a trigger radiation source associated with at least one of said fields of view, and said point defining means comprises trigger sensing means responsive to radiation from said trigger source for activating said light source.

10. An apparatus according to claim 9, wherein said trigger radiation source comprises an infrared diode and said trigger sensing means comprises an infrared sensing photodiode.

11. An apparatus according to claim 1, wherein said calculating means is adapted to calculate a height of said blade in relation to a reference plane.

12. An apparatus according to claim 1, further comprising tachometer means for producing an event marker in relation to rotation of said blade, and wherein said calculating means is adapted to calculate lead or lag of said blade in relation to the event marker.

13. An apparatus according to claim 1, wherein said defining means is located in use at or near the end of said blade.

14. An apparatus for tracking a rotating blade to determine parameters associated with rotation of said blade, said apparatus comprising:
  (a) a detector, defining at least two divergent detector fields;
  (b) a reactive radiation source comprising radiating means and activating means responsive to passage of said blade through said divergent detector fields, for activating said radiating means to radiate a signal therefrom during said passage for detection by said detector; and
  (c) calculating means connected to said detector for calculating from the detector signal said associated parameters.

15. An apparatus according to claim 4, further comprising a trigger radiation source for radiating trigger radiation, said source being associated with at least one of said detector fields, and wherein said activating means of said reactive radiation source is response to said trigger radiation for activating said radiating means.

16. An apparatus according to claim 15, wherein said trigger radiation source comprises an infrared diode and said activating means comprises an infrared sensing diode.

17. An apparatus according to claim 15, wherein said calculating means is adapted to calculate a height of said blade in relation to a reference plane.

18. An apparatus according to claim 15, wherein said trigger radiation source emits a trigger signal modulated at a first modulation frequency, and said reactive radiation source emits a reactive signal modulated at a second modulation frequency.

19. An apparatus according to claim 18, wherein said first modulation frequency is equal to the second modulation frequency.

20. An apparatus according to claim 15, wherein said trigger radiation source radiates light signals and said reactive radiation source radiates light signals in response to the light signals from said trigger radiation source.

21. An apparatus according to claim 20, wherein said reactive radiation source comprises ambient light rejection means for rejecting ambient light signals received thereby.

* * * * *